Figures 1, 2:
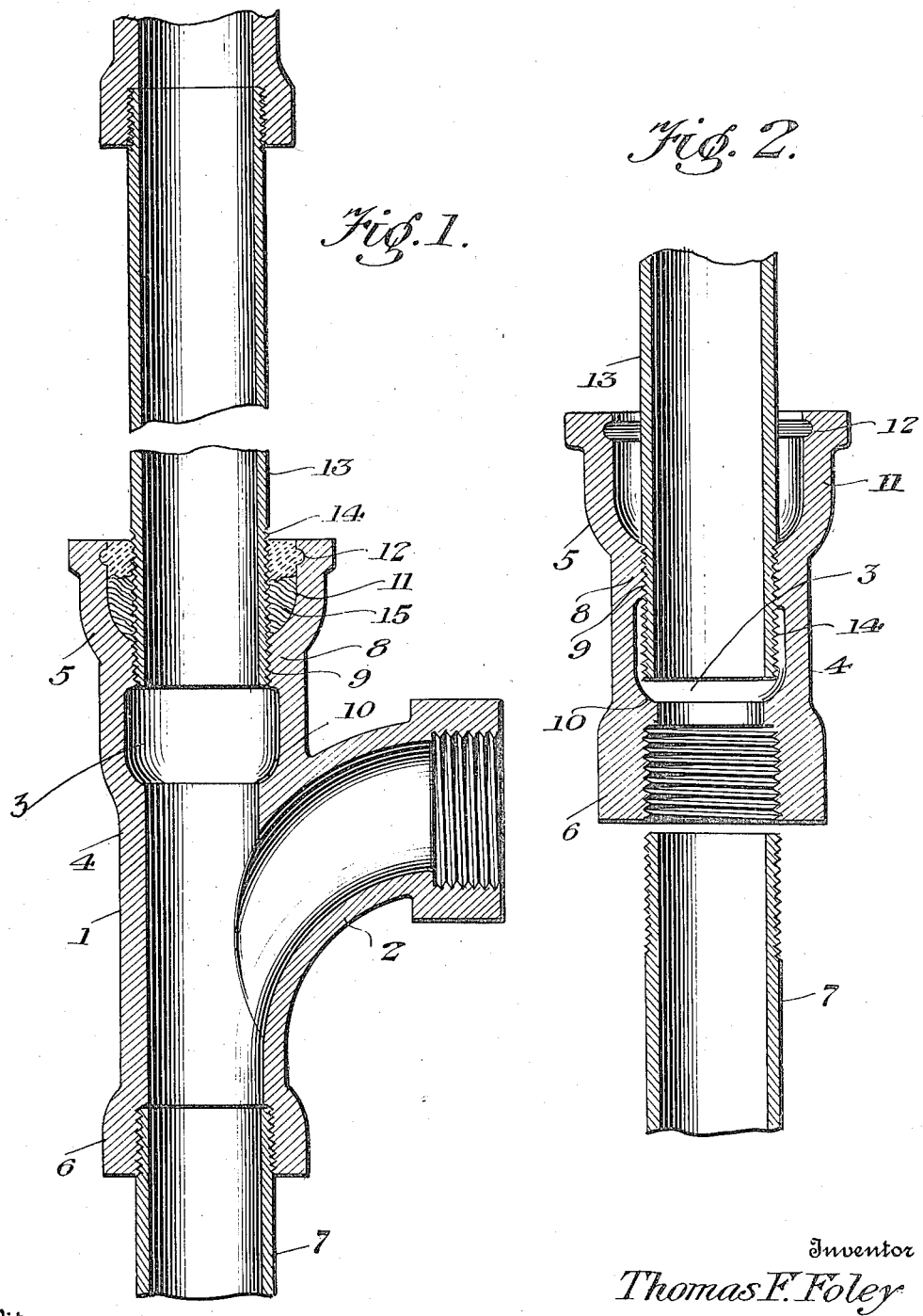

T. F. FOLEY.
CONNECTING SOCKET.
APPLICATION FILED MAR. 16, 1916.

1,282,561. Patented Oct. 22, 1918.

Witness
Inventor
Thomas F. Foley
By
Attorney

UNITED STATES PATENT OFFICE.

THOMAS F. FOLEY, OF WASHINGTON, DISTRICT OF COLUMBIA.

CONNECTING-SOCKET.

1,282,561.     Specification of Letters Patent.     Patented Oct. 22, 1918.

Application filed March 16, 1916. Serial No. 84,657.

*To all whom it may concern:*

Be it known that I, THOMAS F. FOLEY, a citizen of the United States, residing at Washington, in the District of Columbia, have invented new and useful Improvements in Connecting-Sockets, of which the following is a specification.

This invention relates to water distribution, and more especially to detachable pipe couplings; and its principal object is to provide a means whereby two threaded pipes may be easily and quickly joined in a thoroughly effective manner without danger of leakage at the joints, and whereby a smooth uninterrupted passage will be provided between the pipes and coupling.

Another object of the invention is to produce a connecting coupling for threaded pipes which is so constructed and arranged as to permit of a line of pipe being connected in a quicker, better and more efficient manner than can be effected by the present construction and application of couplings.

With the above and other objects in view the improvement resides in the construction, combination and arrangement of parts set forth in the following specification and falling within the scope of the appended claim.

In the drawing:—

Figure 1 is a central vertical longitudinal sectional view through a connecting socket or coupling showing the same connecting two pipes and the socket being centrally provided with a branch or Y, and Fig. 2 is a sectional view through a straight connecting socket with the same threaded upon one pipe preparatory to being rotated in an unscrewing direction to engage with the other pipe.

In the drawing, I have illustrated two forms of the connecting socket. Either of the said sockets may be provided with any number of branches, and the said branches are not necessarily curved or rounded therefrom, as shown in the drawing. The connecting socket comprises a straight member or barrel 4, which, in the present instance, is illustrated as having its ends provided with bells 5 and 6 respectively long and short. In lieu of the lower bell 6, the coupling socket may be provided with exterior or male threads to receive interior or female threads upon the end of the lower pipe member 7, as will be readily understood. The longer, upper bell or hub 5 has an internal pocket 11 at its mouth, a reduced flange 8 next inside the pocket threaded as at 9 to fit the threads of the pipe 13 and run on the same as explained below, a cavity 3 next inside the flange again enlarged so that the threaded inner end of the pipe 13 may run free in it, and a shoulder 10 at the inner end of the cavity, preferably rounded where it merges into the bore of the barrel 4. Axially the pocket may be of considerable length, the flange is rather short, and the cavity is longer than the flange and necessarily longer than the threads within the lower bell or hub or whatever connection with the pipe 7 is employed. The pocket 11 preferably has an internal annular groove or depression 12.

The bore of the bell 5 to the opposite sides of the threaded flange 8 is smooth, and the wall provided by the said bore is rounded to the shoulder 10. A pipe 13 having its end, for a considerable length provided with male threads is adapted to be inserted through the mouth of the bell 5 until the threads 14 engage with the threads 9 of the flange 8. The bore of the pipe 13 is of an area equal to that of the barrel of the connecting member and to that of the pipe 7, so it will be noted that a smooth uninterrupted passage is provided between the pipes 7 and 13, and that material passing through the pipe 13 and cavity 3 will be guided by the rounded shoulder 10, and consequently danger of clogging of such material, common in sockets having rough inner surfaces or threads, will be entirely overcome.

The device illustrated in Fig. 2 of the drawings is substantially similar to that just described, the same, however, comprising a straight member, the branch or Y being eliminated, and consequently the coupling may be of a decidedly less length than that illustrated in Fig. 1. The threads 9 in the flange 8 may be comparatively few in number and are arranged at the same angle of pitch as the threads in the bell or hub 6 so that the coupler socket will not have a tendency to draw the pipes 7 and 13 toward each other. The improvement is primarily adapted to use in connection with waste pipes, vent pipes and the like and has also been found especially useful in the saving of time and labor when employed in connecting branch pipes between two spaced parallel main pipes after the latter have been laid. In such instance the main parallel pipes are provide with the usual T's or with threaded openings which are designed to receive the threaded ends of the branch pipes. When a comparatively large number of branch pipes are to be connected between and to the main pipes it is obvious that a great amount of time and labor would be expended were the branch pipes of single lengths, and also that the branch pipes must necessarily have their ends threaded in opposite directions, and likewise the openings in the main pipes or the T's connected with the main pipes must be oppositely threaded. With my improvement the threads on the branch pipes and the threads in the T's of the oppositely disposed main pipes are of the same pitch, so that the necessity of changing the die in the stock for cutting the threads upon the pipes 7 and 13 will be overcome. The desired number of branch pipes 13 may be threadedly secured to the T's upon one of the main pipes, the said pipes 13 being each, preferably, of an equal length. The coupling sockets 1 have their bells or hubs 5 inserted over the threaded ends 14 of the pipes 13 so that the threads 9 engage with the said threads 14 and the couplers are turned until the ends of the pipes 13 contact with the shoulders 10. The mechanic having ascertained the distance between the inner end of the flange 8 and the inner shoulder of the hub 6 cuts the pipes 7 the desired lengths so that when the pipes 7 are screwed upon the T's of the second named pipes the pipes 7 will be spaced away from the alining pipes 13 a distance equal to that determined, that is, a distance equaling the distance between the shoulder of the hub 6 and the inner wall of the flange 8. The ends of the pipe 7 are, of course, threaded, and if the length of the cavity 3 is greater than the length of the bore of the hub 6, a turning of the coupling member 1 in an unscrewing direction will cause the same to move outwardly of the pipe 13 and onto the threaded end of the pipe 7. If, however, the length of the cavity is equal to or only slightly greater than the length of the bore of the socket 6, the series of branch pipes are swung in unison to bring the connecting sockets angularly with respect to the pipes 7, or to the main pipe to which the pipes 7 are to be connected, to permit of such connection. The pipes 13 are then turned to proper position (also turning the main pipe to which they are connected to its initial position) to bring the hubs 6 directly opposite the threaded ends of the pipes 7, and an unscrewing of the connecting members 1 on the threads 14 of the pipes 13 will cause the threads in the hubs 6 to engage with the threads of the pipes 7. Still again, the pipes 7 may be secured to one of the parallel main pipes, the connecting sockets 1 screwed home upon the said pipes 7 and the branch pipes 13 screwed upon the threads 9 of the flanges 8 of the connecting members until the said pipes 13 contact with the shoulders. To accomplish this the pipes 7 are swung angularly with respect to the main pipe to which they are connected, and the main pipe turned by such movement of the branch pipes. The connected pipes 13 and 7 are then swung in an opposite direction to bring the outer threaded ends of the pipes 13 to aline with the T's in the second main pipe, and the branch pipes 13 are turned in an unscrewing direction so that the inner ends of the same will leave the shoulders 10 and the outer threaded ends engage with the T's in the said second main pipe, thus bringing the inner ends of the branch pipes 13 flush with the inner walls or shoulders provided by the flanges 8 of the coupling members. When the pipes 7 and 13 are connected as above described, a suitable packing 15 is tamped in the pocket 11 of the coupler members, the said packing comprising an outer calking material which is tamped in the mouth of the pocket around the threads 14 of the pipe 13 to cause the same to be compressed in the annular depression 12 in the mouth of the hub 5, thus providing an effective means for preventing leakage between the pipe 13 and the comparatively few threads upon the comparatively small flange 8. In this respect it is to be stated that the threads 9 are only sufficient to retain the pipe 13 in alinement with the pipe 7, and that the packing 15 is mainly, but, of course, not essentially designed as the connecting medium between the pipe 13 and the coupler member 1.

The improvement, it will be noted, is designed for employment in lieu of unions of the ordinary nature, long-screws or right and left hand couplings and materially assists in the saving of time and labor. When a plurality of pipes 7 and 13 are to be connected to parallel main pipes, as above described, all of the said pipes 7 and 13 may be cut to their desired respective lengths by employing the first cut pipes 7 and 13 as a pattern or guide in determining the lengths of the remaining pipes 7 and 13 so it will be noted that a first measurement only of the said pipes 7 and 13 is required, and from the above description, taken in connection with the accompanying drawing, the simplicity of the device, as well as the advantages thereof will, it is thought, be perfectly apparent to those skilled in the art to which such invention appertains without further detailed description.

Having thus described the invention, what I claim is:

A pipe connection comprising a barrel having a straight passageway passing through the same, the said barrel being provided in the vicinity of its opposite ends with internally located threads of the same diameter and pitch, the passageway in the barrel adjacent one thread being less in diameter than the said threaded portions, the passageway in the barrel adjacent the other thread being greater in diameter than the said threaded portions, thereby providing a shoulder within the barrel and the said shoulder being located at a distance from the adjacent thread which is greater than the length of the other thread.

In testimony whereof I affix my signature in the presence of two witnesses.

THOMAS F. FOLEY.

Witnesses:
WM. J. KOERTH,
BENNETT S. JONES.